(12) United States Patent
Mizutani et al.

(10) Patent No.: US 11,951,362 B2
(45) Date of Patent: Apr. 9, 2024

(54) INFORMATION PROCESSING APPARATUS AND NON-TRANSITORY COMPUTER-READABLE STORAGE MEDIUM FOR EXTRACTING CHARACTERISTIC AMOUNTS OF A GOLF BALL STRIKING SOUND

(71) Applicant: BRIDGESTONE SPORTS CO., LTD., Tokyo (JP)

(72) Inventors: Daichi Mizutani, Chichibu (JP); Takuichi Shimizu, Chichibu (JP)

(73) Assignee: BRIDGESTONE SPORTS CO., LTD., Tokyo (JP)

( * ) Notice: Subject to any disclaimer, the term of this patent is extended or adjusted under 35 U.S.C. 154(b) by 43 days.

(21) Appl. No.: 17/534,037

(22) Filed: Nov. 23, 2021

(65) Prior Publication Data

US 2022/0203180 A1 Jun. 30, 2022

(30) Foreign Application Priority Data

Dec. 24, 2020 (JP) .................................. 2020-214425

(51) Int. Cl.
*A63B 47/00* (2006.01)
*A63B 37/00* (2006.01)
*G01H 17/00* (2006.01)
*H04R 1/08* (2006.01)

(52) U.S. Cl.
CPC .......... *A63B 47/008* (2013.01); *G01H 17/00* (2013.01); *H04R 1/08* (2013.01); *A63B 37/0003* (2013.01)

(58) Field of Classification Search
CPC .............. A63B 47/008; A63B 37/0003; A63B 2220/808; A63B 2220/836; G01H 17/00; G01H 3/06; G01H 3/12; H04R 1/08
See application file for complete search history.

(56) References Cited

U.S. PATENT DOCUMENTS

| 9,073,566 B2 * | 7/2015 | Takenaka ............ B60W 40/068 |
| 9,410,561 B2 * | 8/2016 | Orita ........................ F15B 13/02 |
| 9,682,569 B2 * | 6/2017 | Munakata ............ B41J 2/04501 |

(Continued)

FOREIGN PATENT DOCUMENTS

| JP | 2001-314534 A | 11/2001 |
| JP | 2003-325707 A | 11/2003 |

(Continued)

*Primary Examiner* — Natalie Huls
*Assistant Examiner* — Cynthia L Davis
(74) *Attorney, Agent, or Firm* — Sughrue Mion, PLLC

(57) ABSTRACT

An information processing apparatus that estimates a hit feeling of a golf ball, includes a characteristic amount obtainment unit configured to obtain a characteristic amount of a striking sound which an estimation target ball generates as a sound source upon the estimation target ball being struck and an estimation unit configured to estimate a hit feeling of the estimation target ball based on correlation information and the characteristic amount obtained by the characteristic amount obtainment unit. The correlation information indicates correlation, for a plurality of kinds of test balls, between a hit feeling which a testing golfer feels at the time of striking a test ball and a characteristic amount of a striking sound which the test ball generates as a sound source upon the test ball being struck.

8 Claims, 8 Drawing Sheets

(56) References Cited

U.S. PATENT DOCUMENTS

| | | | |
|---|---|---|---|
| 2002/0072434 A1* | 6/2002 | Yabu | A63B 53/0466 473/345 |
| 2004/0138007 A1* | 7/2004 | Kim | A63B 37/0003 473/371 |
| 2014/0260636 A1* | 9/2014 | Kammerer | A63B 37/00776 73/646 |

FOREIGN PATENT DOCUMENTS

| | | |
|---|---|---|
| JP | 2004-219106 A | 8/2004 |
| JP | 2006-239132 A | 9/2006 |

* cited by examiner

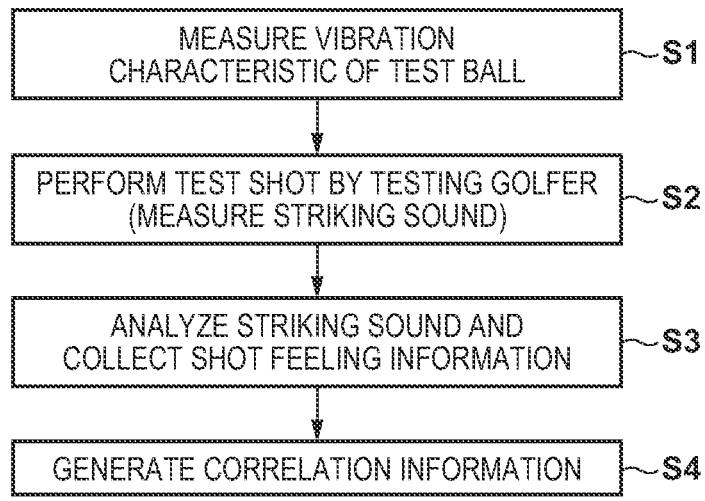
FIG. 2A
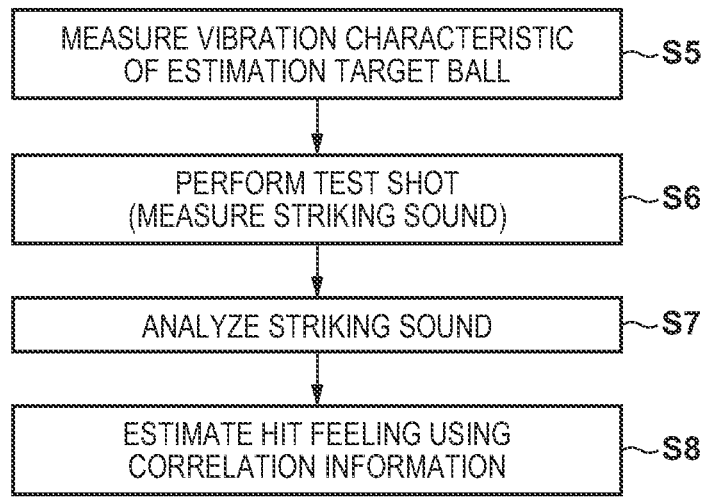
FIG. 2B
FIG. 3
| VIBRATION MODE | NATURAL FREQUENCY (Hz) |
|---|---|
| FIRST-ORDER | 3184 |
| SECOND-ORDER | 4937 |
| THIRD-ORDER | 6851 |
| FOURTH-ORDER | 8698 |
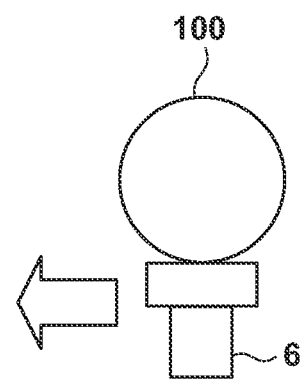

FIG. 7

| BALL | CHARACTERISTIC AMOUNT | | | | | | SHOT FEELING INFORMATION | |
|---|---|---|---|---|---|---|---|---|
| | FIRST-ORDER | | FIRST-ORDER | SECOND-ORDER | SECOND-ORDER | SECOND-ORDER | | |
| | FREQUENCY | SOUND PRESSURE | ATTENUATION TIME | FREQUENCY | SOUND PRESSURE | ATTENUATION TIME | HARDNESS | WEIGHT |
| a | 4393 | 57 | 0.0058 | 6525 | 55 | 0.0035 | +5 | -1 |
| b | ... | ... | ... | ... | ... | ... | ... | ... |
| c | ... | ... | ... | ... | ... | ... | ... | ... |
| d | ... | ... | ... | ... | ... | ... | ... | ... |
| ... | ... | ... | ... | ... | ... | ... | ... | ... |

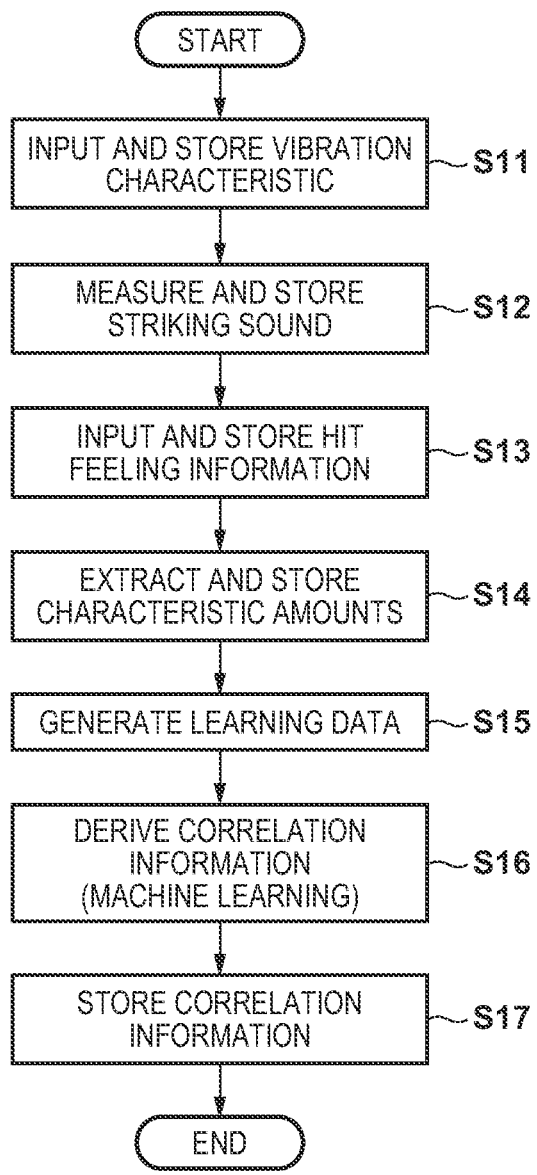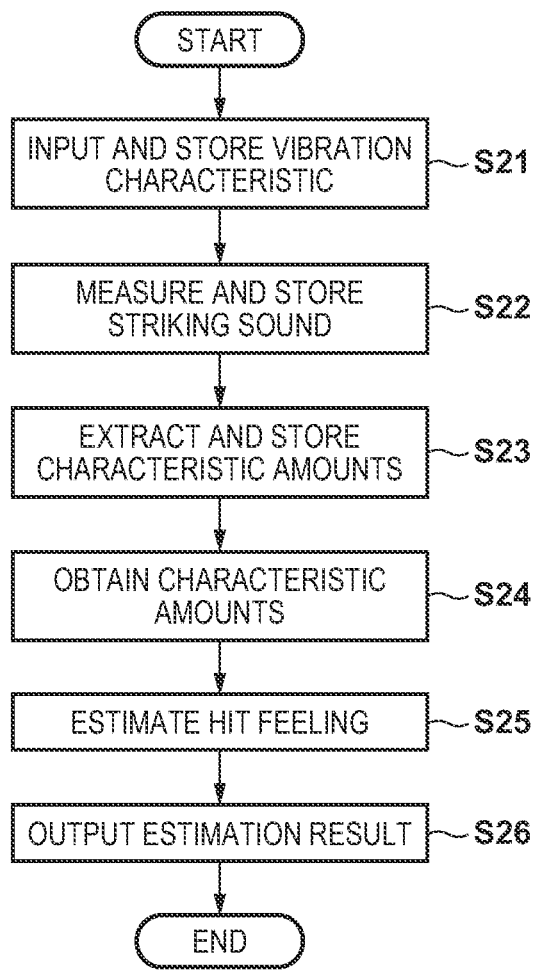

INFORMATION PROCESSING APPARATUS AND NON-TRANSITORY COMPUTER-READABLE STORAGE MEDIUM FOR EXTRACTING CHARACTERISTIC AMOUNTS OF A GOLF BALL STRIKING SOUND

CROSS-REFERENCE TO RELATED APPLICATION(S)

This application claims priority to and the benefit of Japanese Patent Application No. 2020-214425 filed on Dec. 24, 2020, the entire disclosure of which is incorporated herein by reference.

BACKGROUND OF THE INVENTION

Field of the Invention

The present invention relates to a technique of estimating a hit feeling which a golfer feels upon striking a golf ball.

Description of the Related Art

There has been proposed a technique of analyzing the golf ball striking sound of a golf club to utilize it for the development of the golf club (Japanese Patent Laid-Open Nos. 2006-239132, 2003-325707, and 2001-314534, and Japanese Patent No. 3996517).

As a factor to be considered when a golfer selects a golf ball to use from a various kinds of golf balls, the hit feeling of the golf ball (or the feel of striking the golf ball) is used. The evaluation of a hit feeling conventionally depends on the impression (sensory evaluation) of a testing golfer such as a professional golfer who actually struck a golf ball. During the development stage of a golf ball, in order to evaluate the hit feeling for each of golf balls with various specifications, a test shot by the testing golfer is required each time. Thus, there has been room for improvement in terms of the development efficiency.

SUMMARY OF THE INVENTION

It is an object of the present invention to provide a technique that enables evaluation of the hit feeling of a golf ball without the need for evaluation of the hit feeling by a testing golfer.

According to an aspect of the present invention, for example; there is provided an information processing apparatus that estimates a hit feeling of a golf ball, the apparatus comprising: a characteristic amount obtainment unit configured to obtain a characteristic amount of a striking sound which an estimation target ball generates as a sound source upon the estimation target ball being struck; and an estimation unit configured to estimate a hit feeling of the estimation target ball based on correlation information and the characteristic amount obtained by the characteristic amount obtainment unit, wherein the correlation information indicates correlation, for a plurality of kinds of test balls; between a hit feeling which a testing golfer feels at the time of striking a test ball and a characteristic amount of a striking sound which the test ball generates as a sound source upon the test ball being struck.

Further features of the present invention will become apparent from the following description of exemplary embodiments (with reference to the attached drawings).

BRIEF DESCRIPTION OF THE DRAWINGS

FIG. 2A is a flowchart illustrating an example of a correlation information derivation method;

FIG. 2B is a flowchart illustrating an example of a hit feeling estimation method;

FIG. 3 is a view showing an example of measuring of the vibration characteristic of a ball;

FIG. 7 is a table showing an example of learning data;

FIG. 9 is a flowchart illustrating a processing example of an information processing apparatus; and FIG. 10 is a flowchart illustrating another processing example of the information processing apparatus.

DESCRIPTION OF THE EMBODIMENTS

Figure 1:
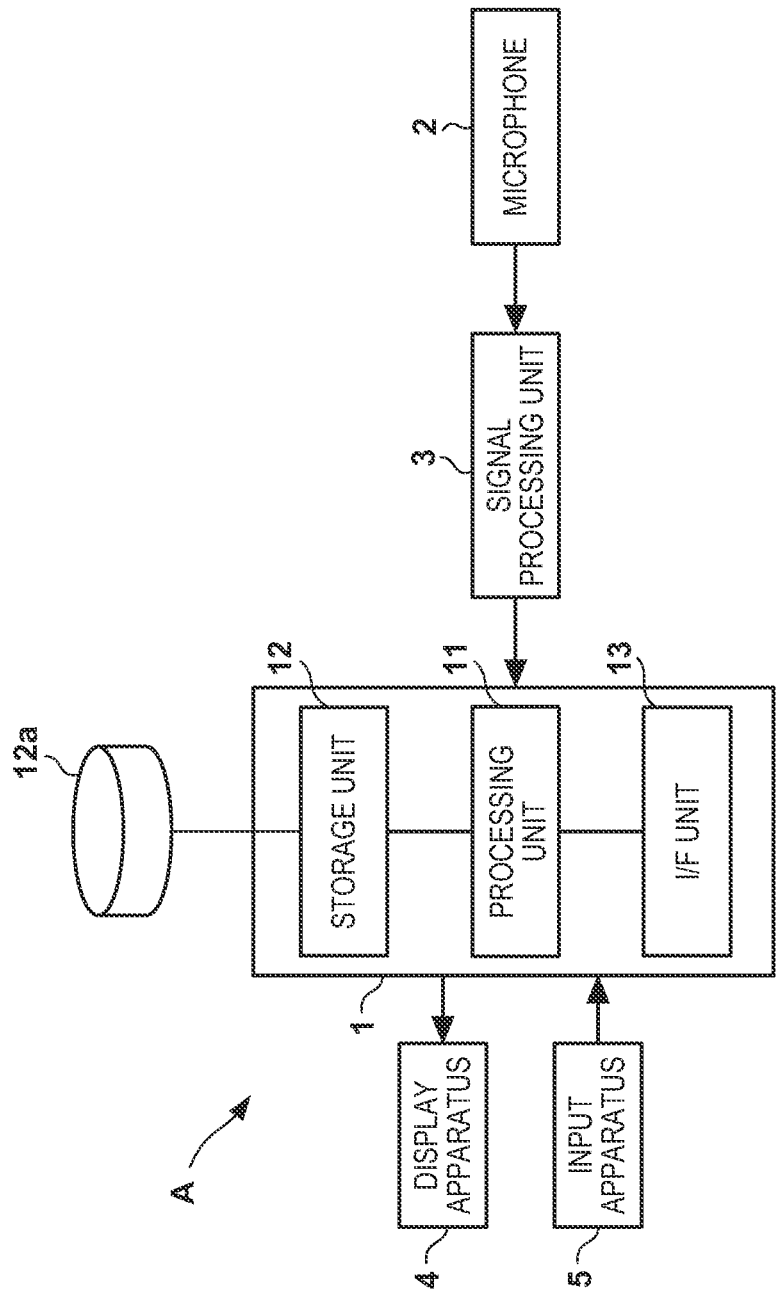
FIG. 1 is a schematic view of an information processing system according to an embodiment of the present invention.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

<Configuration of System>

FIG. 1 is a schematic view of a system A using an information processing apparatus 1 according to an embodiment of the present invention. The system A includes the information processing apparatus 1, a microphone 2, a signal processing unit 3, a display apparatus 4, and an input apparatus 5.

The microphone 2 is an apparatus that collects the striking sound when a golfer or a swing robot strikes a golf ball with a golf club. The signal processing unit 3 is an electric circuit that processes the sound signal collected by the microphone 2, and includes, for example, a circuit for conversing an analog signal to a digital signal, a filter circuit for removing noise, and the like. Time-series data of the striking sound can be obtained using the microphone 2 and the signal processing unit 3.

The information processing apparatus 1 is a computer that estimates, from a striking sound, the hit feeling of a golf ball which a golfer feels upon striking the golf ball. The information processing apparatus 1 includes a processing unit 11, a storage unit 12, and an I/F unit (interface unit) 13 which are electrically connected to each other. The processing unit 11 is a processor such as a CPU. The storage unit 12 includes one or a plurality of storage devices. The storage device is, for example, a RAM, a ROM, a hard disk, or the like. The storage unit 12 stores programs to be executed by the processing unit 11 and various kinds of data. The storage unit 12 includes a database 12a that stores correlation information, learning data, the sound signal data collected by the microphone 2, and the like which are to be described later. The program to be executed by the processing unit 11 can be formed by a plurality of instructions readable by the processing unit 11. It is also possible to store the program to be executed by the processing unit 11 in a storage medium such as a CD-ROM or a DVD and install the program in the information processing apparatus 1.

The I/F unit 13 performs input/output of data between an external device and the processing unit 11. The I/F unit 13 can include an input/output interface or a communication interface. The signal processing unit 3 is connected to the I/F unit 13, and a measurement result of the striking sound collected by the microphone 2 is obtained by the information processing apparatus 1.

The display apparatus 4 and the input apparatus 5 are connected to the information processing apparatus 1. The display apparatus 4 is, for example, an electronic image display apparatus such as a liquid crystal display apparatus, and displays a processing result (such as a hit feeling estimation result) of the information processing apparatus 1. The input apparatus 5 includes a mouse or a keyboard, and accepts data inputs and operation instructions to the information processing apparatus 1.

<Procedure of Hit Feeling Estimation>

In this embodiment, the hit feeling of a golf ball is estimated from a striking sound. The estimation of the hit feeling is performed based on correlation information indicating the correlation between the striking sound (particularly, the characteristic amount of the striking sound (or striking sound component) which the golf ball generates as a sound source) and the sensory evaluation of the hit feeling. In order to distinguish between a golf ball used in the generation of the correlation information and a golf ball for which the hit feeling is estimated, the former is referred to as a test ball and the latter is referred to as an estimation target ball for the sake of convenience.

With reference to FIGS. 2A and 2B, a rough process procedure will be described. Note that examples of processing operations to be performed by the information processing apparatus 1 will be described later with reference to FIGS. 9 and 10. The process is roughly divided into processing of deriving the correlation information and processing of estimating the hit feeling of an estimation target ball using the derived correlation information.

<Derivation of Correlation Information>

First, the processing of deriving the correlation information will be described with reference to FIG. 2A. FIG. 2A is a flowchart illustrating an example of a correlation information derivation method.

In step S1, the vibration characteristic of a test ball is measured to obtain vibration characteristic information. A striking sound includes, in addition to a sound (or sound component) whose sound source is the golf ball, a sound whose sound source is the golf club and an environmental sound. In order to extract, in the whole striking sound, only a sound (or sound component) whose sound source is the golf ball, in this embodiment, the vibration characteristic of the test ball is measured. FIG. 3 is a view showing an example of measuring the vibration characteristic of a ball, and shows actual measurement values of a general ball. A golf ball 100 is mounted on a vibration measuring instrument 6, and its response characteristic to a vibration is measured. Note that although not shown, the vibration measuring instrument includes an accelerator, a force sensor, and a vibrating apparatus. By the eigenvalue analysis of the measurement result, the natural frequencies of the golf ball 100 in vibration modes of a plurality of orders can be obtained as the vibration characteristic information. The vibration characteristic is measured for each of a plurality of kinds of golf balls used as test balls.

The illustrated example shows an example in which the respective natural frequencies from the first-order vibration mode to the fourth-order vibration mode are obtained. The natural frequencies to be used are not limited to those from the first-order vibration mode to the fourth-order vibration mode as in this embodiment, but the natural frequencies from the first-order vibration mode to the second-order vibration mode may be used, or the natural frequencies from the first-order vibration mode to the fifth- or higher-order vibration mode may be used. However, in terms of the relationship between the striking sound and hit feeling of the golf ball or the calculation efficiency, the order degree of the vibration mode may be selected such that the natural frequency falls within a range from 1,000 Hz to 12,000 Hz. Further, the vibration characteristic of the test ball may be analyzed by simulation such as fine element analysis using a physical model of the test ball.

Referring back to FIG. 2A, in step S2, a testing golfer performs a test shot of the test ball, and its striking sound is measured by the microphone 2. For example, the testing golfer is a professional golfer. Since the test shot involves the sensory evaluation of the hit feeling, the striking sound may be measured in an environment close to an actual competition (a golf course or an environment close to a golf course).

Figure 4B:
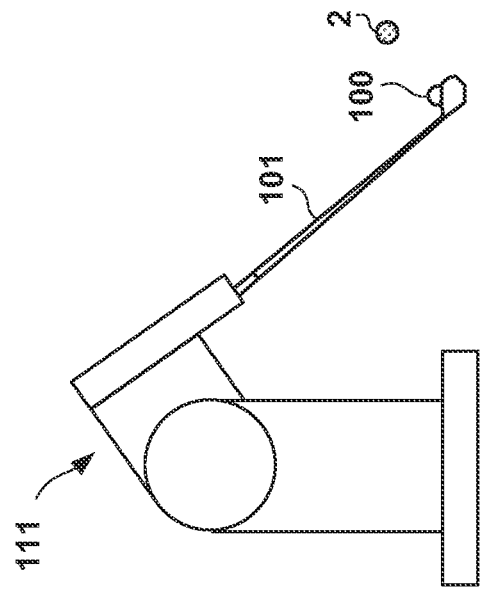
FIGS. 4A and 4B are views each showing an example of a striking sound measuring mode.
Figure 4A:
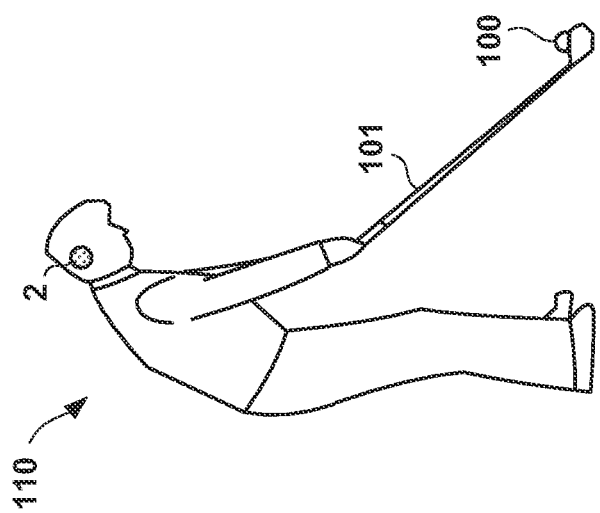

FIG. 4A shows an example of a striking sound measuring mode. The illustrated example shows an example in which a testing golfer 110 strikes a golf ball 100 serving as the test ball with a golf club 101. The microphone 2 is, for example, a small microphone, and provided near the ear of the testing golfer 110 so that the striking sound heard by the testing golfer 110 and the striking sound measured by the microphone 2 are as close as possible to each other. The microphone 2 is mounted on the ear of the testing golfer 110 using, for example, a clip. The striking sound is also measured for each of the plurality of kinds of golf balls used as test balls, and the measurement result is stored in association with individual information specifying the individual test ball.

Figure 5:
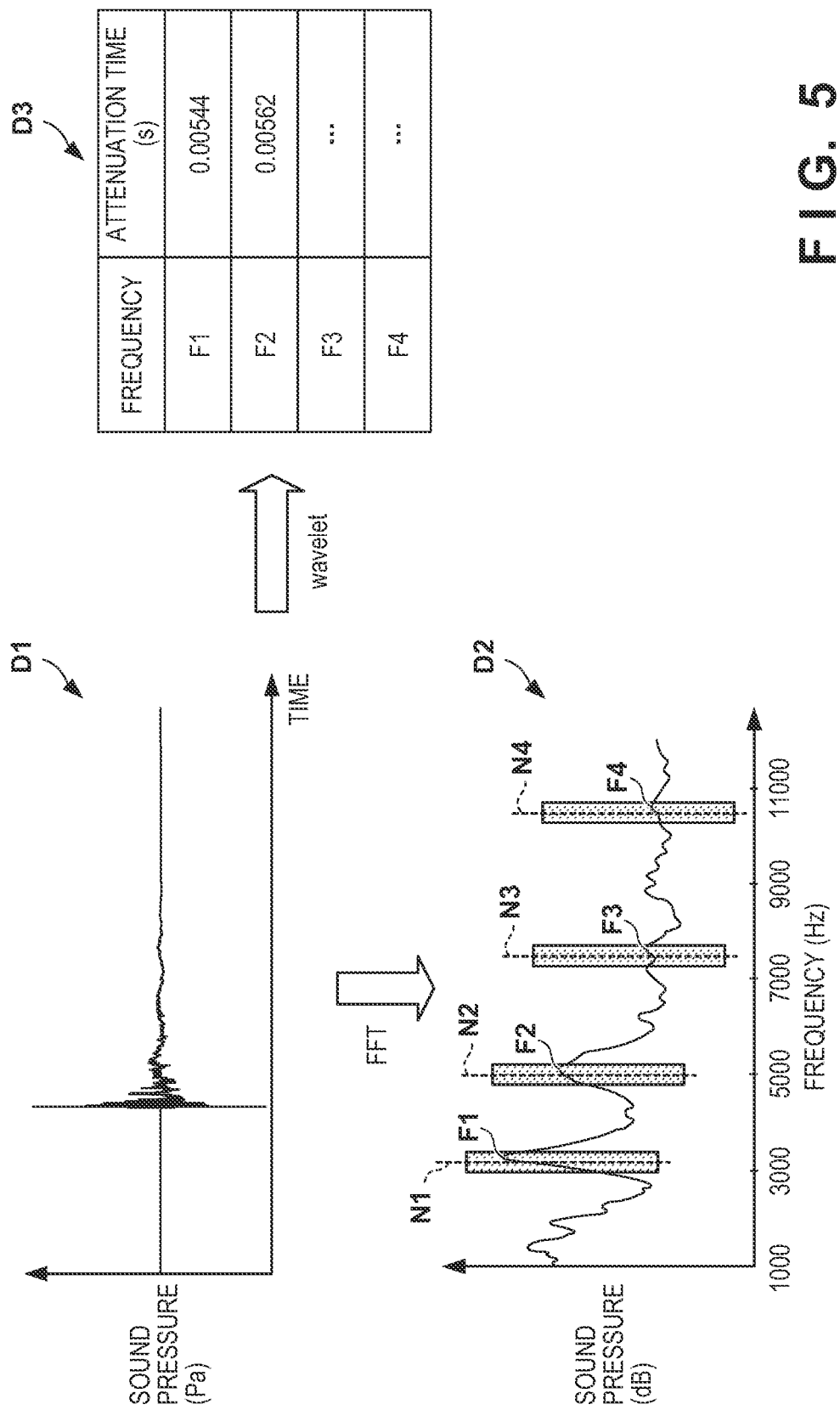
FIG. 5 is a view showing an example of analysis on a striking sound.

Referring back to FIG. 2A, in step S3, analysis of the striking sound measured in step S2 and collection of the sensory evaluation (hit feeling information) for the hit feeling which the testing golfer felt are performed. In the analysis of the striking sound, the characteristic amount of the striking sound from the test ball as the sound source is extracted. FIG. 5 is a view showing an example of the analysis.

Sound data D1 indicates the sound signal data (temporal change in sound pressure) of the striking sound measured by the microphone 2 and processed by the signal processing unit 3. By performing fast Fourier transform (FFT) on the sound signal data, frequency characteristic data D2 indicating the relationship between the frequency of the striking sound and the sound pressure (sound pressure level) can be obtained. As has been described above, the striking sound, includes a sound from the golf club head as the sound source and an environmental sound. By using the vibration characteristic (natural frequencies) of the test ball measured in step S1, it is possible to extract, from the frequency characteristic data D2, the characteristic amount of the striking sound from the test ball as the sound source.

A specific example will be described. The natural frequencies of the test ball from the first-order vibration mode to the fourth-order vibration mode are indicated by N1 to N4, respectively. When the example shown in FIG. 3 is applied, N1=3184 Hz, N2=4937 Hz, N3=6851 Hz, and N4=8698 Hz. Of the frequency characteristic data. D2, the frequencies corresponding to the natural frequencies N1 to N4 can be considered as the characteristic frequencies of the striking sound from the test ball as the sound source.

However, since the struck ball as the sound source moves while vibrating, the frequency of the striking sound reaching the microphone does not always match the measurement result of the vibration characteristic of the test ball obtained in step S1 due to the Doppler effect. Therefore, the frequency having a peak of the sound pressure within a predetermined frequency range of each of the natural frequencies N1 to N4 of the test ball is used as the characteristic frequency of the striking sound from the test ball as the sound source. In the example shown in FIG. 5, the frequency having a peak of the sound pressure within a range of ±200 Hz with each of the natural frequencies N1 to N4 as the center is used as the characteristic frequency of the striking sound from the test ball as the sound source. For example, if N1=3184 Hz, the frequency (F1 in the example shown in FIG. 5), having a peak of the sound pressure within a range from 2,984 Hz to 3,384 Hz is used as the characteristic frequency of the striking sound from the test ball as the sound source. In the example shown in FIG. 5, the characteristic frequencies F1 to F4 are specified for the natural frequencies N1 to N4 of the test ball, respectively. The characteristic frequencies F1 to F4 and their sound pressures (characteristic sound pressures) are used as the characteristic amounts of the striking sound from the test ball as the sound source. Note that the characteristic sound pressure may be the peak value, or may be the average value in the above-described predetermined frequency range (the range of ±200 Hz) (for example, the sound pressure corresponding to the frequency F1 may be the average value of the sound pressures in the range from 2,984 Hz to 3,384 Hz).

Further, by performing wavelet transform on the sound signal data D1, it is possible to obtain data D3 including the characteristic frequency of the striking sound and the vibration attenuation time (for example, a time for the sound pressure to drop from the peak sound pressure to 10% thereof). The attenuation time of each of the characteristic frequencies F1 to F4 is obtained, and this is used as the characteristic amount (characteristic attenuation time) of the striking sound from the test ball as the sound source.

As has been described above, in this embodiment, as the characteristic amounts of the striking sound from the test ball as the sound source, the characteristic frequencies F1 to F4 of the striking sound corresponding to the natural frequencies N1 to N4 of the test ball, the characteristic sound pressures (sound pressure levels) in the characteristic frequencies F1 to F4, and the characteristic attenuation times of the characteristic frequencies F1 to F4 are used. These characteristic amounts are stored in association with the individual information specifying the individual test ball. Note that although the three amounts described above are used as the characteristic amounts of the striking sound from the test ball as the sound source in this embodiment, one or two of the three amounts may be used.

Figure 6:
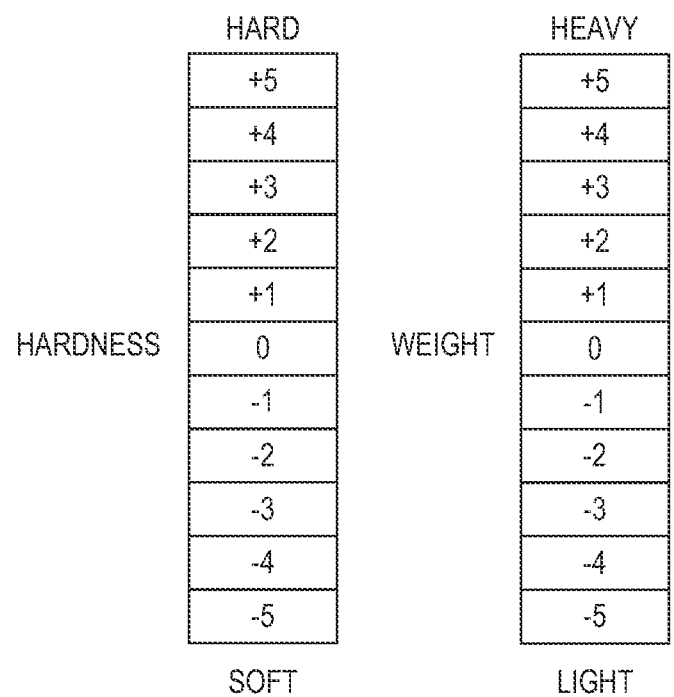
FIG. 6 is a view showing an example of quantification of a hit feeling.

FIG. 6 shows an example of the kinds (evaluation axes) of the hit feeling and quantification thereof. In the illustrated example, two kinds of hit feeling evaluation axes including the hardness and weight feelings of the golf ball are exemplarily shown. However, the number of kinds of the hit feeling evaluation axes may be one, or may be three or more.

Hardness is the evaluation axis regarding whether the feeling of the golf ball felt by the testing golfer at the time of striking the golf ball is hard or soft Weight is the evaluation axis regarding whether the weight feeling of the golf ball felt by the testing golfer at the time of striking the golf ball is heavy or light.

Each kind is quantified in 11 steps. The testing golfer is asked to report the scores of the two kinds of hit feelings for each test ball, and the scores are stored as hit feeling information in association with the kind of the test ball, "0" of the test ball means an average feeling. The testing golfer may first perform a test shot of a golf ball which serves as a reference (the numeric value is 0) for the hit feeling evaluation, and give a score by comparison with the reference ball.

Referring back to FIG. 2A, in step S4, correlation information is generated using the characteristic amounts of the striking sound from the test ball as the sound source and the hit feeling information obtained in step S3. As the correlation information, in addition to a form of an arithmetic expression, a form of a classification rule can be employed. Here, an example of deriving the correlation information as an arithmetic expression will be described, and particularly, an example of deriving the arithmetic expression by machine learning will be described.

FIG. 7 shows an example of learning data used for machine learning. The learning data includes the characteristic amounts and the hit feeling information for each test ball. The characteristic amounts are the characteristic amounts of the striking sound from the test ball as the sound source, and include the characteristic frequencies (F1 to F4 in FIG. 5) of the striking sound corresponding to the first-order vibration mode to the fourth-order vibration mode, respectively, the characteristic sound pressure and characteristic attenuation time (D3 in FIG. 5) in each characteristic frequency. The hit feeling information includes the score for hardness and the score for weight. In the illustrated example, a set of learning data for one ball (for example, a ball a) is exemplarily shown. However, if a plurality of testing golfers are participated in test shots, it is possible to obtain learning data sots of the number equal to the number of the testing golfers.

Figure 8:
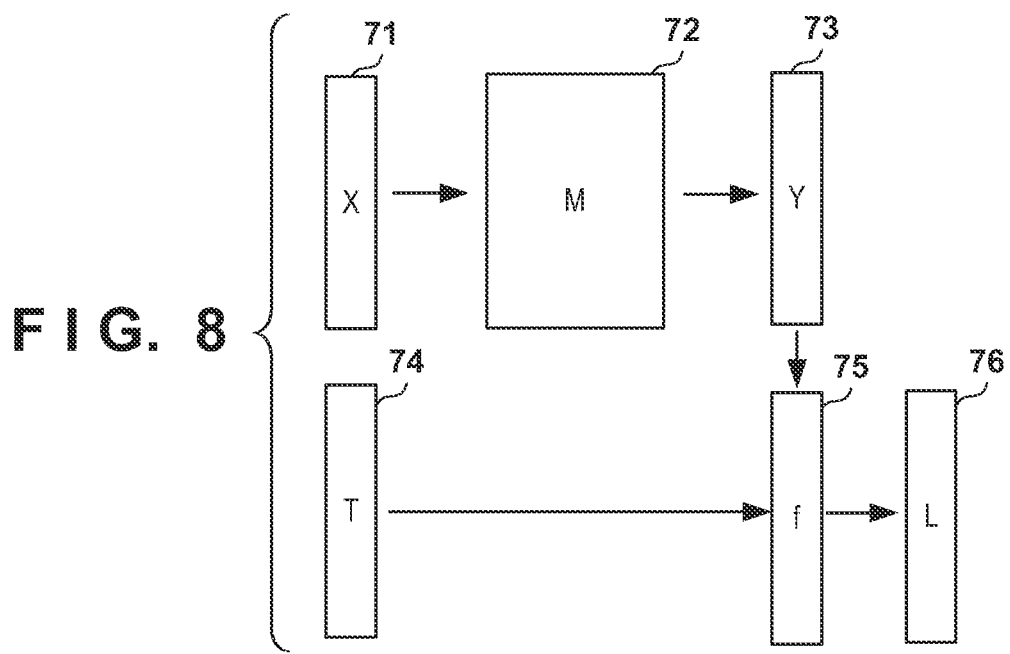
FIG. 8 is a view showing an example of machine learning.

FIG. 8 is a conceptual view showing the structure of input/output in machine learning. Input data X (71) is data in the input layer of a learning model 72. As a result of recognizing the input data X using the learning model 72 as a machine learning model, output data Y (73) is output. At the time of learning, supervised data T (74) is given as the correct answer data of the recognition result of the input data X. Therefore, by giving the output data Y and the supervised data T to a loss function 75, a deviation amount L (76) from the correct answer of the recognition result can be obtained. By updating the coefficient, weighting, and the like of the learning model 72 such that the deviation amount L is decreased for a large number of learning data, the learning model 72 is optimized. The data of the characteristic amounts shown in FIG. 7 are used as the input data. X, and the data of the hit feeling information shown in FIG. 7 is used as the supervised data T.

For example, the learning model 72 can be expressed in a form of a linear equation as:

*hit* feeling: hardness=$a1$×first-order characteristic frequency+$b1$×first-order characteristic sound pressure+$c1$×first-order characteristic attenuation time+$a2$×second-order characteristic frequency+$b2$×second-order characteristic sound pressure+$c2$×second-order characteristic attenuation time+$a3$×third-order characteristic frequency+$b3$×third-order characteristic sound pressure+$c3$×third-order characteristic attenuation time+$a4$×fourth-order characteristic frequency+$b4$×fourth-order characteristic sound pressure+$c4\times$fourth-order characteristic attenuation time The coefficients at to a4, b1 to b4, and c1 to c4 are optimized by machine learning. The weight of the hit feeling can be expressed similarly. Note that the learning model 72 may be a model using a neural network other than the model described above.

As a result of the above machine learning, an arithmetic expression expressing the correlation between the characteristic amounts of the striking sound from the test ball as the sound source and the hit feeling can be obtained. If the coefficient of the term becomes substantially 0 as the result of the learning, this term may be deleted from the arithmetic expression. According to the inventor's experiment, of the hit feeling, the hardness is relatively largely influenced by the first-order characteristic frequency, characteristic sound pressure, and characteristic attenuation time, and the weight is relatively largely influenced by the second-order characteristic frequency, characteristic sound pressure, and characteristic attenuation time.

<Estimation of Hit Feeling>

Next, the processing of estimating the hit feeling of an estimation target ball using the correlation information will be described with reference to FIG. 2B. FIG. 2B is a flowchart illustrating an example of a hit feeling estimation method.

In step S5, the vibration characteristic of an estimation target ball is measured to obtain vibration characteristic information. This is processing similar to that in step S1, and the vibration characteristic (in this embodiment, the natural frequencies from the first-order vibration mode to the fourth-order vibration mode) of the estimation target ball required to use the correlation information is measured. The vibration characteristic is measured for each of estimation target golf balls.

In step S6, a test shot of the estimation target ball is performed, and its striking sound is measured by the microphone 2. As a form of the test shot, in addition to the form exemplarily shown in FIG. 4A in which a person (testing golfer 110) strikes the ball, a swing robot 111 may strike the ball as exemplarily shown in FIG. 4B. At the stage of estimation of the hit feeling, the sensory evaluation of the hit feeling during the test shot is unnecessary. Therefore, it is efficient to perform the test shot using the swing robot 111. Further, even when a person performs the test shot, since it is only required to measure the striking sound, it is unnecessary to perform the test shot by a person such as a professional golfer who has excellent sensitivity to a hit feeling. Accordingly, it is also possible to perform the test shot by a beginner- to intermediate-level golfer. Since the test shot does not involve the sensory evaluation of the hit feeling, the striking sound may be measured in an environment (anechoic room or semi-anechoic room) where only the striking sound can be measured more clearly.

As the swine robot 111, in addition to a type in which a driving source such as a motor turns an arm portion holding the golf club 101, it is possible to use a type in which no driving source is included and the arm portion is manually lifted to the top position by the user and naturally dropped (naturally turned) due to gravity. In the former type including the driving source, a driving sound can be easily included in the striking sound. Therefore, the latter type including no driving source is advantageous in that the less ambient sound is included in the striking sound. Further, the surface of the swing robot 111 may be covered with a sound absorbing material. This can prevent the operation sound of the swine robot 111 from being included in the striking sound.

When the swing robot 111 including no driving source is used, there may be a case in which the striking sound is small. Therefore, as indicated by a solid line in FIG. 4B, the microphone 2 may be arranged near the golf ball 100 (in the vicinity of, for example, within several meters from the striking position).

Referring back to FIG. 2B, in step S7, the striking sound measured in step SC is analyzed. This is similar to the analysis described with reference to step S3 and FIG. 5. With this, as the characteristic amounts of the striking sound from the estimation target ball as the sound source, the first-order to fourth-order characteristic frequencies of the striking sound corresponding to the respective natural frequencies of the estimation target ball in the first- to fourth-order vibration modes, the respective characteristic sound pressures (sound pressure levels), and the respective characteristic attenuation times can be obtained. In step SR, the characteristic amounts of the striking sound from the estimation target ball as the sound source, which have been obtained in step S7, are substituted in the arithmetic expression serving as the correlation information derived in step S4. Thus, the estimation result of the hit feeling (hardness and weight) can be obtained.

As has been described above, in this embodiment, the hit feeling evaluation by a testing golfer such as a professional golfer is necessary for deriving the correlation information, but in the subsequent hit feeling evaluation for the golf ball, the hit feeling evaluation by the testing golfer is unnecessary if the striking sound can be measured. Accordingly, the development of the golf ball can be performed more efficiently. Further, it is possible to clarify the relationship between the striking sound and the hit feeling, which has been unknown conventionally.

According to the inventor's experiment, in a golf club including a head having a high percentage of hollowness such as a driver head, the striking sound tended to be dominated by the head rather than the golf ball. On the other hand, in a golf club including a solid head or a head having a low percentage of hollowness such as an iron head, particularly a wedge or putter head, the characteristic of the golf ball tended to appear relatively conspicuously in the striking sound. Therefore, the method according to this embodiment is particularly effective in the hit feeling evaluation of a golf ball at the time of striking the golf ball using an iron-type club (particularly a wedge) or a putter club. Moreover, when using such a golf club, the hit feeling of a golf ball tends to be prioritized. Accordingly, this method is more effective. It is not always necessary to use the same golf club or the golf clubs of the same kind (number, wood type, iron type, hollow, solid, loft angle, material, or the like) for the test shot in step S2 and the test shot in step SC, but the hit feeling estimation with higher accuracy can be performed if the same club or the clubs of the same kind are used.

Processing Example of Information Processing Apparatus

Part or all of the correlation information derivation method illustrated in FIG. 2A and the hit feeling estimation method illustrated in FIG. 2B can be automated by the information processing apparatus 1. With reference to FIGS. 9 and 10, an example of the automation will be described. FIG. 9 is a flowchart illustrating an example of processing of the processing unit 11 related to the derivation of correlation information, and FIG. 10 is a flowchart illustrating an example of processing of the processing unit 11 related to the hit feeling estimation.

First, FIG. 9 will be described. In step S11, an input of the vibration characteristic information of a test ball measured in advance is accepted. The vibration characteristic information can be input by an operation using the input apparatus 5. The input contents are stored in the database 12a in association with the individual information specifying the individual test ball.

In step S12, a striking sound is measured and stored. After a testing golfer strikes the test ball 100 in the mode shown in FIG. 4A and the striking sound at this time is measured by the microphone 2 and processed by the signal processing unit 3, its sound data (D1 in FIG. 5) is stored in the database 12a in association with the individual information specifying the individual test ball. In step S13, an input of the hit feeling information is accepted. The hit feeling information can be input by the operator inputting the score of the hit feeling (hardness and weight) heard from the testing golfer while using the input apparatus 5, The input contents are stored in the database 12a in association with the individual information specifying the individual test ball.

In step S14, the characteristic amounts of the striking sound from the test ball as the sound source are extracted from the sound data of the striking sound stored in step S12. Here, the sound data is read out from the database 12a, and frequency characteristic data (D2 in FIG. 5) is generated by performing FFT. Further, the vibration characteristic information of the test ball is read out from the database 12a and, from the frequency characteristic data, the characteristic frequencies (F1 to F4 in FIG. 5) of the striking sound corresponding to the first-order vibration mode to the fourth-order vibration mode of the test ball, respectively, and the characteristic sound pressures at the respective frequencies are specified as the characteristic amounts of the striking sound from the test ball as the sound source. Furthermore, by performing wavelet transform on the sound data read out from the database 12a, the characteristic attenuation times (D3 in FIG. 5) of the respective characteristic frequencies (F1 to F4 in FIG. 5) are specified as the characteristic amounts of the striking sound from the test ball as the sound source. The extracted characteristic amounts are stored in the database 12a in association with the individual information specifying the individual test ball.

In step S15, the hit feeling information stored in step S13 and the characteristic amounts extracted in step S14 are obtained by reading them out from the database 12a, and learning data (FIG. 6) is generated from the obtained hit feeling information and characteristic amounts. In step S16, an arithmetic expression is derived as correlation information by machine learning. In step S17, the correlation information derived in step S16 is stored in the database 12a. Thus, the processing related to the derivation of correlation information is completed.

The processing of hit feeling estimation illustrated in FIG. 10 will be described. In step S21, an input of the vibration characteristic information of an estimation target ball measured in advance is accepted. The vibration characteristic information can be input by the operation using the input apparatus 5. The input contents are stored in the database 12a in association with the individual information specifying the individual estimation target ball.

In step S22, a striking sound is measured and stored. Here, processing similar to that in step S12 is performed, That is, the test ball 100 is struck in the mode shown in FIG. 4A or the mode shown FIG. 4B. After the striking sound is measured by the microphone 2 and processed by the signal processing unit 3, its sound data (similar to D1 in FIG. 5) is stored in the database 12a in association with the individual information specifying the individual estimation target ball.

In step S23, the characteristic amounts of the striking sound from the estimation target ball as the sound source are extracted from the sound data of the striking sound stored in step S22. Here, processing similar to that in step S14 is performed. That is, the sound data is read out from the database 12a, and frequency characteristic data (similar to D2 in FIG. 5) is generated by performing FFT. Further, the vibration characteristic information of the estimation target ball is read out from the database 12a and, from the frequency characteristic data, the characteristic frequencies (similar to F1 to F4 in FIG. 5) of the striking sound corresponding to the first-order vibration mode to the fourth-order vibration mode of the test ball, respectively, and the sound pressures at the respective characteristic frequencies are specified as the characteristic amounts of the striking sound from the estimation target ball as the sound source. Furthermore, by performing wavelet transform on the sound data read out from the database 12a, the characteristic attenuation times (similar to D3 in FIG. 5) of the respective characteristic frequencies are specified as the characteristic amounts of the striking sound from the estimation target ball as the sound source. The extracted characteristic amounts are stored in the database 12a in association with the individual information specifying the individual estimation target ball.

In step S24, the characteristic amounts stored in step S23 are obtained by reading them out from the database 12a. In step S25, from the characteristic amounts obtained in step S24 and the correlation information read out from the database 12a, the hit feeling of the estimation target ball is estimated. In step S26, the estimation result obtained in step S25 is displayed on the display apparatus 4. Thus, the processing related to the hit feeling estimation is completed. In the example illustrated in FIG. 10, when measurement of the striking sound is started in step S22, the processing up to the output of the estimation result in step S26 is automatically performed. However, for example, in the processing of obtaining the characteristic amounts in step S24, the characteristic amount may be obtained by accepting operator's input of the characteristic amount calculated separately. In this case, the operator can input the characteristic amount using the input apparatus 5.

The invention is not limited to the foregoing embodiments, and various variations/changes are possible within the spirit of the invention.

What is claimed is:

1. An information processing apparatus that estimates a hit feeling of a golf ball, the apparatus comprising:
    a storage device configured to store respective natural frequencies of an estimation target ball in vibration modes of a plurality of orders, and a measurement result of a striking sound upon the estimation target ball being struck, and
    a processor configured, by executing a program, to perform:
    extracting, by a frequency component digital signal processing of input audio, a plurality of kinds of characteristic amounts of a striking sound which the estimation target ball generates as a sound source upon the estimation target ball being struck; and
    estimating, based on a result of the frequency component digital signal processing of input audio, a hit feeling of the estimation target ball based on correlation information and the extracted characteristic amounts, wherein the correlation information indicates correlation, for a plurality of kinds of test balls, between a hit feeling which a testing golfer feels at the time of striking a test ball and the plurality of kinds of characteristic amounts of a striking sound which the test ball generates as a sound source upon the test ball being struck, wherein in the extracting:

the respective natural frequencies and the measurement result are read from the storage device; and a frequency having a peak of a sound pressure within a predetermined range for each of the natural frequencies, a sound pressure of the frequency having the peak of the sound pressure within the predetermined frequency range, and an attenuation time of the frequency having the peak of the sound pressure within the predetermined frequency range are extracted from the measurement result, and wherein the plurality of kinds of characteristic amounts includes the frequency, the sound pressure and the attenuation time extracted in the extracting.

2. The apparatus according to claim 1, wherein the natural frequencies are obtained by a preliminary vibration experiment, and inputted to the information processing apparatus.

3. The apparatus according to claim 1, wherein the correlation information is an arithmetic expression in which the plurality of kinds of characteristic amounts of the striking sound which the estimation target ball generates as the sound source is used as a variable and a level of the hit feeling is used as a solution.

4. The apparatus according to claim 1, wherein the hit feeling is specified using a plurality of kinds of evaluation axes, and one of the plurality of kinds of evaluation axes is a hardness of a golf ball which a person who strikes the golf ball feels at the time of striking the golf ball.

5. The apparatus according to claim 1, wherein the striking sound of the estimation target ball is a striking sound of the estimation target ball struck by a swing robot.

6. The apparatus according to claim 1, wherein the striking sound of the estimation target ball is a striking sound of the estimation target ball struck using an iron type club or a putter club.

7. The information processing apparatus according to claim 1, wherein the hit feeling includes at least: a quantified hardness of a golf ball whether hit feeling is hard or soft; and a quantified weight of a golf ball whether hit feeling is heavy or light.

8. The information processing apparatus according claim 1, wherein the attenuation time is a time for the sound pressure to drop from the peak of the sound pressure to 10% thereof.

* * * * *